United States Patent
Krishnapuram et al.

(10) Patent No.: US 9,910,921 B2
(45) Date of Patent: Mar. 6, 2018

(54) KEYWORD REFINEMENT IN TEMPORALLY EVOLVING ONLINE MEDIA

(71) Applicant: International Business Machines Corporation, Armonk, NY (US)

(72) Inventors: Raguhuram Krishnapuram, Bangalore (IN); Sameep Mehta, New Delhi (IN); Chawda Bhupesh Shyamsundar, New Delhi (IN); L Venkata Subramaniam, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 13/780,874

(22) Filed: Feb. 28, 2013

(65) Prior Publication Data
US 2014/0244611 A1   Aug. 28, 2014

(51) Int. Cl.
*G06F 17/30* (2006.01)

(52) U.S. Cl.
CPC .... *G06F 17/30864* (2013.01); *G06F 17/3064* (2013.01)

(58) Field of Classification Search
None
See application file for complete search history.

(56) References Cited

U.S. PATENT DOCUMENTS

| | | | |
|---|---|---|---|
| 8,065,145 B2 | 11/2011 | Okamoto et al. | |
| 2007/0133947 A1* | 6/2007 | Armitage | G06F 17/30256 386/224 |
| 2008/0040673 A1* | 2/2008 | Zuckerberg | G06F 17/30867 715/745 |
| 2008/0300910 A1* | 12/2008 | Ku | G06F 17/30864 705/1.1 |
| 2009/0030899 A1* | 1/2009 | Tareen | G06F 17/30722 |
| 2010/0293105 A1* | 11/2010 | Blinn | G06Q 10/10 705/319 |
| 2011/0191175 A1* | 8/2011 | Elbaz | G06F 17/30616 705/14.49 |

(Continued)

FOREIGN PATENT DOCUMENTS

WO   WO 2012061813 A1   5/2012

OTHER PUBLICATIONS

Li, Rui et al., "TEDAS: a Twitter-based Event Detection and Analysis System," 2012 IEEE 28th International Conference on Data Engineering, Washington, DC, USA, Apr. 1-5, 2012, pp. 1273-1276, IEEE Digital Library.

(Continued)

*Primary Examiner* — Apu Mofiz
*Assistant Examiner* — Farhad Agharahimi
(74) *Attorney, Agent, or Firm* — Ference & Associates LLC

(57) ABSTRACT

Methods and arrangements for keyword refinement and enhancement. There is received an initial keyword list comprising one or more keywords. Information is harvested from one or more information feeds, and an item is ascertained from the harvested information. One or more keywords from the initial keyword list are associated with the item. One or more new keywords are developed based on the associating of one or more keywords from the initial keyword list with the item. Other variants and embodiments are broadly contemplated herein.

16 Claims, 5 Drawing Sheets

(56) References Cited

U.S. PATENT DOCUMENTS

| | | | |
|---|---|---|---|
| 2011/0313844 A1* | 12/2011 | Chandramouli ... | G06Q 30/0241 705/14.42 |
| 2011/0320715 A1* | 12/2011 | Ickman ................. | G06Q 30/02 711/118 |
| 2012/0079020 A1* | 3/2012 | Park ...................... | H04L 51/046 709/204 |
| 2012/0213404 A1* | 8/2012 | Steiner .............. | G06F 17/30256 382/103 |
| 2012/0254188 A1 | 10/2012 | Koperski et al. | |
| 2012/0259842 A1 | 10/2012 | Oman et al. | |

OTHER PUBLICATIONS

Krstajic, Milos et al., "Getting There First: Real-Time Detection of Real-World Incidents on Twitter," 2nd IEEE Workshop on Interactive Visual Text Analytics, "Task-Driven Analysis of Social Media" as part of IEEE VisWeek, 2012, Seattle, Washington, USA, Oct. 15, 2012, 4 pages, IEEE Digital Library.

Piskorski, Jakub et al., "Cluster-Centric Approach to News Event Extraction," New Trends in Multimedia and Network Information Systems, A. Zgrzywa et al. (Eds.), 2008, pp. 276-290, IOS Press Online Library.

Shan, Dongdong et al., "EventSearch: A System for Event Discovery and Retrieval on Multi-Type Historical Data," KDD'12, Beijing, China, Aug. 12-16, 2012, pp. 1564-1567, ACM Digital Library.

Becker, Hila et al., "Selecting Quality Twitter Content for Events," Proceedings of the Fifth International AAAI Conference on Weblogs and Social Media, Barcelona, Spain, Jul. 17-21, 2011, pp. 442-445, Association for the Advancement of Artificial Intelligence (www.aaai.org).

Website: "WordNet: A lexical database for English." can be found at http://wordnet.princeton.edu/wordnet/. Accessed Feb. 26, 2013.

\* cited by examiner

Initial Keyword FIRE:

Expanded Candidate list:[lost, event, destruct, burn, fire]

Scores for each of the expansion keywords:

Keyword: lost :0.0
Keyword: event :5.0
Keyword: destruct :8.0
Keyword: burn :4.0
Keyword: fire :10.0

221

There was news about some explosion in China

FIRE:

Expanded list:[lost, event, destruct, burn, fire, china, explosion]

Keyword: lost :8.0
Keyword: event :5.0
Keyword: destruct :4.0
Keyword: burn :5.0
Keyword: fire :9.0
Keyword: china :22.0
Keyword: explosion :2.0

EARTHQUAKE:

Expanded list:[volcan, result, surfac, plane, movement, shake, vibrat, earth, activ, fault, underground]

Scores for each of the expansion keywords:

Keyword: volcan :0.0
Keyword: result :3.0
Keyword: surfac :0.0
Keyword: plane :5.0
Keyword: movement :10.0
Keyword: shake :1.0
Keyword: vibrat :0.0
Keyword: earth :10.0
Keyword: activ :0.0
Keyword: fault :2.0
Keyword: underground :3.0

KEYWORD REFINEMENT IN TEMPORALLY EVOLVING ONLINE MEDIA

BACKGROUND

Generally, users employ keywords in conducting searches in different domains, including online media. Keywords tend to be predetermined by search engines or other online media being accessed by a user. Lists of keywords, as such, are typically static and then may be partly refreshed based on retrieved search results. However, the evolution of an event or other item associated with a keyword (and that may be sought in a search) is normally not considered, nor is temporal or spatial information relating to the event or other item.

As such, conventional keyword management arrangements tend not to take into account complexities such as those just mentioned. More particularly, such methods tend only to focus on expanding a query based on words which are thought to increase precision and recall, while no contextual, spatial or temporal information is considered. Query expansion methods thus become static, and terms that may be useless or outdated may well not be removed, even if such may be warranted on the basis of a realtime status of the event or item in question.

BRIEF SUMMARY

In summary, one aspect of the invention provides a method of keyword enhancement, the method comprising: utilizing a processor to execute computer code configured to perform the steps of: receiving an initial keyword list comprising one or more keywords; harvesting information from one or more information feeds and ascertaining an item from the harvested information; associating one or more keywords from the initial keyword list with the item; and developing one or more new keywords based on the associating of one or more keywords from the initial keyword list with the item.

Another aspect of the invention provides an apparatus for keyword enhancement, the apparatus comprising: at least one processor; and a computer readable storage medium having computer readable program code embodied therewith and executable by the at least one processor, the computer readable program code comprising: computer readable program code configured to receive an initial keyword list comprising one or more keywords; computer readable program code configured to harvest information from one or more information feeds and ascertain an item from the harvested information; computer readable program code configured to associate one or more keywords from the initial keyword list with the item; and computer readable program code configured to develop one or more new keywords based on the associating of one or more keywords from the initial keyword list with the item.

An additional aspect of the invention provides a computer program product for keyword enhancement, the computer program product comprising: a computer readable storage medium having computer readable program code embodied therewith, the computer readable program code comprising: computer readable program code configured to receive an initial keyword list comprising one or more keywords; computer readable program code configured to harvest information from one or more information feeds and ascertain an item from the harvested information; computer readable program code configured to associate one or more keywords from the initial keyword list with the item; and computer readable program code configured to develop one or more new keywords based on the associating of one or more keywords from the initial keyword list with the item.

A further aspect of the invention provides a method comprising: obtaining information relative to one or more events from a plurality of information feeds; comparing the obtained information to an input keyword list; determining one or more events from the obtained information and matching the one or more events to one or more keywords from the input keyword list; quantifying a correlation between the at least one event and the matched one or more keywords; and based on the quantified correlation, adding one or more new keywords relative to the one or more events.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIGS. 2 and 3 provide illustrative examples of keyword list expansion.

DETAILED DESCRIPTION

Figure 1:
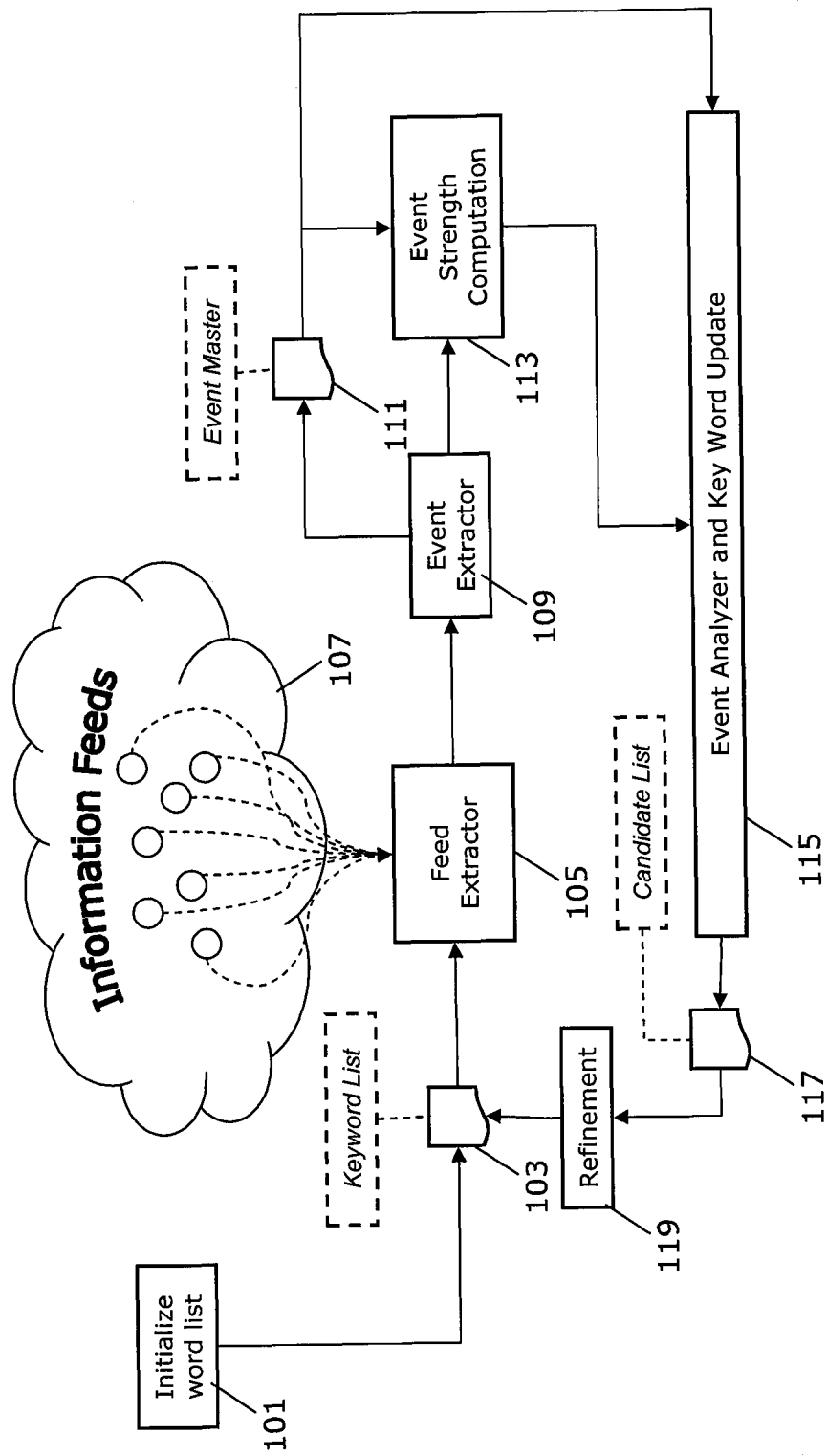
FIG. 1 schematically illustrates a system overview.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
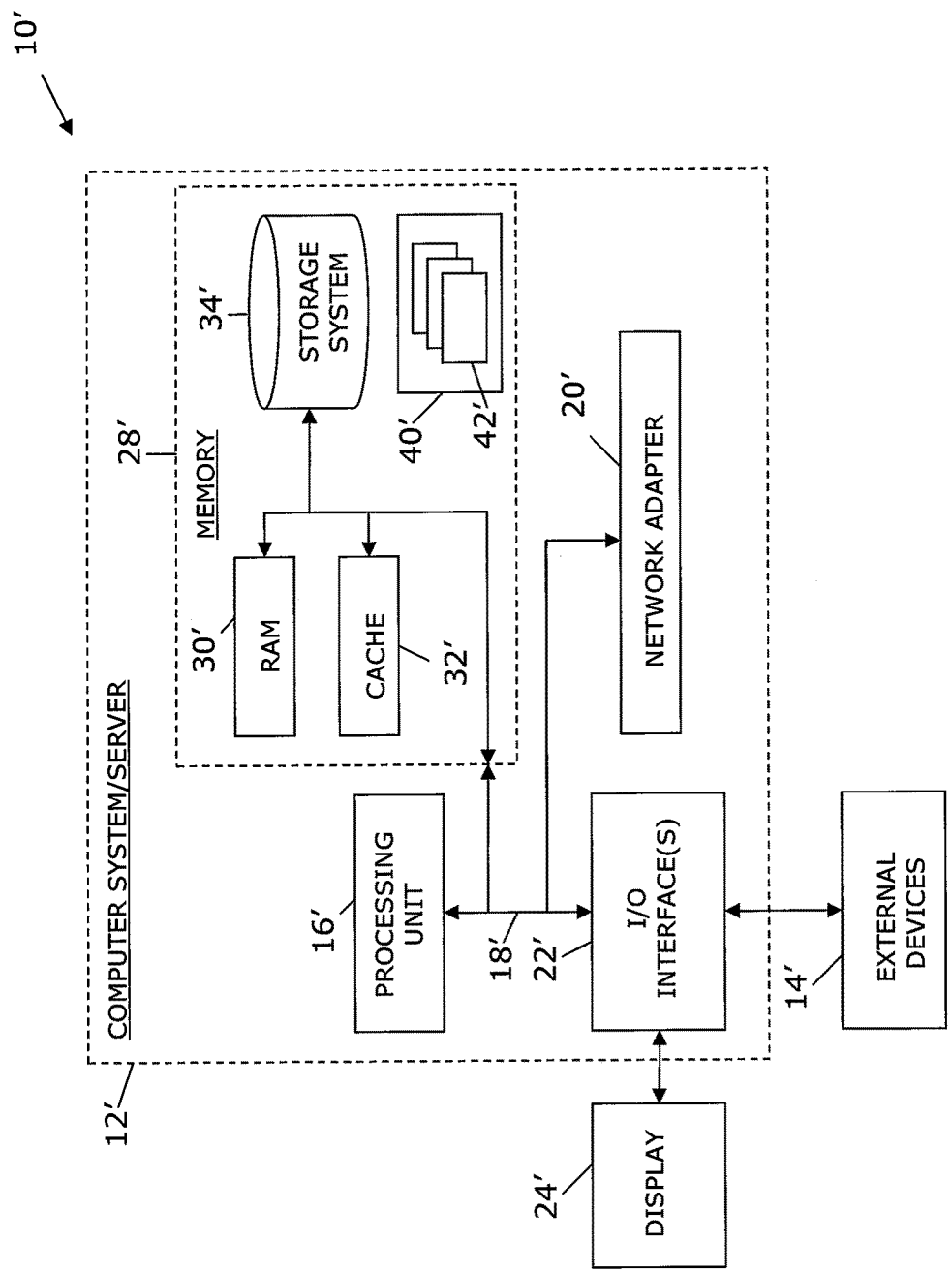
FIG. 5 illustrates a computer system.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

In accordance with at least one embodiment of the invention, query expansion incorporates several cues by way of helping to expand a keywords set. Among such cues are context-related ones, temporal ones and spatial ones. Context-related cues incorporate knowledge about an actual event or item (e.g., fire, earthquake, etc.), to help in extending a list.

In accordance with at least one embodiment of the invention, temporal cues relate to a temporal evolution of an event or item, to thereby keep a keyword list updated. For instance, in the illustrative example of an earthquake, temporal evolution may involve: Reporting of Earthquake (location, scale etc)→Damage Reporting→Relief Reporting. A keyword expansion module thus will take such evolution into account in expanding a list.

In accordance with at least one embodiment of the invention, spatial cues relate to the location of an event or item, and to spatial growth thereof, inasmuch as these can play a role in expanding a keyword list. For example, such events can include a "mass demonstration . . . ", a "growing fire . . . " or "crowd in altercation . . . ", while associated spatial cues can derive from any noted location in the text of transmitted messages, or in geo-coding of the messages. Accordingly, if an event happens at a location determined from spatial cues, then the system proceeds to obtain more messages from that determined location so as to obtain additional targeted information regarding the event.

In accordance with a non-restrictive and illustrative example accordance with at least one embodiment of the invention, a public safety example can involve "fire" as a keyword, to the extent that a user wishes to find out about a specific one (e.g., one that took place in Mumbai, Mantralaya building, on Jun. 21, 2012). If this keyword is applied to a microblogging application (e.g. "TWITTER"), consider that more than 800,000 microblog entries (or "tweets") may result generally, out of which ~3000 may relate to the actual fire in Mumbai.

However, in accordance with the present illustrative example in accordance with at least one embodiment of the invention, it can be noted that many potentially relevant and useful results will have been lost, for the lack of other pertinent events or items related to the fire. Particularly, an enhanced or expanded keyword list might advantageously include not just "fire" but also "Mumbai" and/or "Mantralaya", "ambulance", "fire trucks", etc. Related items such as "Adarsh" (the name of a housing concern whose documents first thought to be lost in the fire) could also be included in such a list. Thus, it can be appreciated that an expanded or enhanced keyword list can capture data and information that more closely reflects an actual item or incident, as well as associated items or events.

FIG. 1 schematically illustrates a system overview, in accordance with at least one embodiment of the invention. First, a keyword word list 103 is initialized (101). The list can be manually created, e.g., by listing high-level items or events based on domain expertise, or can be created on a basis of known event schedules (e.g., soccer games, rock concerts, etc.). A feed extractor 105 then serves to extract information from multiple social media, microblogging, internet (e.g., internet discussion group) and/or other sources 107. An event extractor or detector 109 can perform unsupervised or clustered gathering of keywords from the feeds, e.g., guided by bootstrapping via using an initial list of keywords as cluster centers. Each cluster can be represented by a feature vector of the form {Set of Keywords, Locations, Time}. Essentially any suitable clustering algorithm may be employed here, such as K-means clustering.

In accordance with at least one embodiment of the invention, an event master 111 stores a list of all events which have been extracted/determined over a given time period, e.g., during the course of a current day. This event master is consulted upon extraction/determination of an event by extractor 109 and before strength/score computation 113 (itself described more fully below). As such, event master 111 verifies whether an event referred to in a new message, and extracted therefrom by extractor 109, is indeed new. Event master 111 can also feed information to strength/score computation such as the number of messages associated with a single event (whereupon, e.g., a higher number of messages can contributed to a higher event score).

In accordance with at least one embodiment of the invention, each detected event or item is assigned (113) a score (which can also be regarded as an "event strength"), based on a variety of factors, including, e.g., number of data elements, users, unique information content, etc. Then, events/items are analyzed and keywords updated (115). Particularly, an extracted feature vector is analyzed to update keywords wherein, e.g., keywords may be added for stronger (or growing) events (that is, events with higher determined scores) and may be removed for weaker (or declining) events (that is events, with lower determined scores).

In accordance with at least one embodiment of the invention, a candidate list 117 is generated, which is then submitted for refinement (119). Refinement may be undertaken via natural language processing (NLP) and serve to add or remove synonyms, add associated sentiments and tag objects and/or subjects. By way of illustrative example, negative sentiments can be associated with messages that include portions such as "I am feeling low" and "Not feeling good :(". Synonyms can be discerned in situations involving different designations for the same event, such as "Traffic Jam at location X" and "Traffic Build-up at X". Finally, a suitable NLP-based named entity recognizer can be employed to parse messages to determine and classify portions thereof; e.g., from "John is going to New York at 2 PM", the named entity recognizer can identify "John" as a person, "New York" as a place and "2 PM" as a time. The result is then a revised keyword list 103, which then can be cycled through another process of keyword expansion and refinement, starting with feed extractor 105, as described heretofore.

In accordance with at least one embodiment of the invention, keyword expansion (in analyzing/updating 115) can accept as input a feature vector for each event or item (as derived from feeds 107), the vector specifying one or more keywords, locations and times. Temporal evolution information related to a state of the event (e.g., "growing", "declining", "no change") is also included in or appended to the feature vector. Such information can be obtained, e.g., via maintaining a histogram for the event and learning the trend of the histogram.

Then, in accordance with at least one embodiment of the invention, for each event, keywords can be analyzed using POS (part of speech) tagging to yield nouns and verbs. Semantic meaning can then be employed to compute relevance of a keyword (by determining a ratio of new word strength or score to initial keyword strength or score); this can be undertaken, e.g., using the "syn-set" feature of "WordNet©" (http://wordnet.princeton/edu/wordnet/). All words can then be ranked on the basis of their importance (e.g., as determined via a score ratio as employed in "syn-set") and/or whether proper nouns are involved (e.g., proper nouns can be rated more highly by default in that they point to a known real-world entity). Each word is marked as being associated with a growing, declining or "stationary" event. A candidate list 117 is then generated. This can be undertaken by applying a threshold based on determined scores, and/or via an imposed limit on the number of words which can be searched at the same time.

In accordance with at least one embodiment of the invention, with the candidate list available 117, refinement (119) may proceed as follows. Documents are generated for each state, and all words with zero or less discriminative power are removed. ("State" here refers to temporal evolution information as noted above—"growing", "declining", "no change"—while "discriminative power" refers to how uniquely a word associates with one event only [i.e., a degree to which a word uniquely conveys, describes or relates a single corresponding event]. In essence, words which do not help in differentiating one event from another are preferably removed, since using such words as "leads" or "clues" will not help provide focused information relative to a single event.) One manner of accomplishing this, by way of illustrative example, is a standard TF-IDF algorithm.

In accordance with at least one variant embodiment of the invention, if RSS (rich site summary) feeds have been extracted (105) from external sources (107) such as social media and event websites, etc., then relevant feeds can be retained on the basis of event location and time. Feeds can then be compared, via their text and semantics, with candidate keywords 117. Then, as an additional step of thresh-olding to arrive at an updated list 103, and as part of the refinement step 119, keywords are ranked on the basis of similarity.

In accordance with at least one additional variant embodiment of the invention, assume that a final keyword list, including original and new keywords, should be represented by K keywords for N events. Let $n_i$ represent keywords which are associated with an $N_{th}$ event, with $p_i$ quantifying the state and importance of the event (based on the aforementioned scores). ($P_i$ can thereby convey, e.g., a quantity Importance*State. Thus, by way of illustrative example, an event with a "growing" state can be mapped to 1, "declining" to 1 and "constant" [or "no change"] to 0.5 while, as a quantifiable metric, importance can be captured by the determined strength or score of the event) Then:

$$n_i = \frac{Kp_i}{\sum_{i=0}^{N} Kp_i}$$

This will ensure that "growing" events attract more keywords in an expanding list, while excess words (above the limit of K) with lower ranks can be removed.

FIGS. 2 and 3 provide illustrative examples of keyword list expansion, in accordance with at least one embodiment of the invention. In one example (221) in FIG. 2, starting with a keyword "FIRE", an expanded list yields live new keywords, and scores for each of the expansion keywords are calculated and applied. In another example 223 starting with "FIRE", here involving news of an explosion in China, an expanded list includes two more words ("china", "explosion"). In the example 325 of FIG. 3, the original keyword "EARTHQUAKE" yields eleven new words (some of which are "stem" words such as "volcan", "surfac", "vibrat", etc., as is well-known in text mining applications for allowing for variants with suffixes such as "-ing", "-ed", etc.), and scores are calculated and applied for each.

Figure 4:
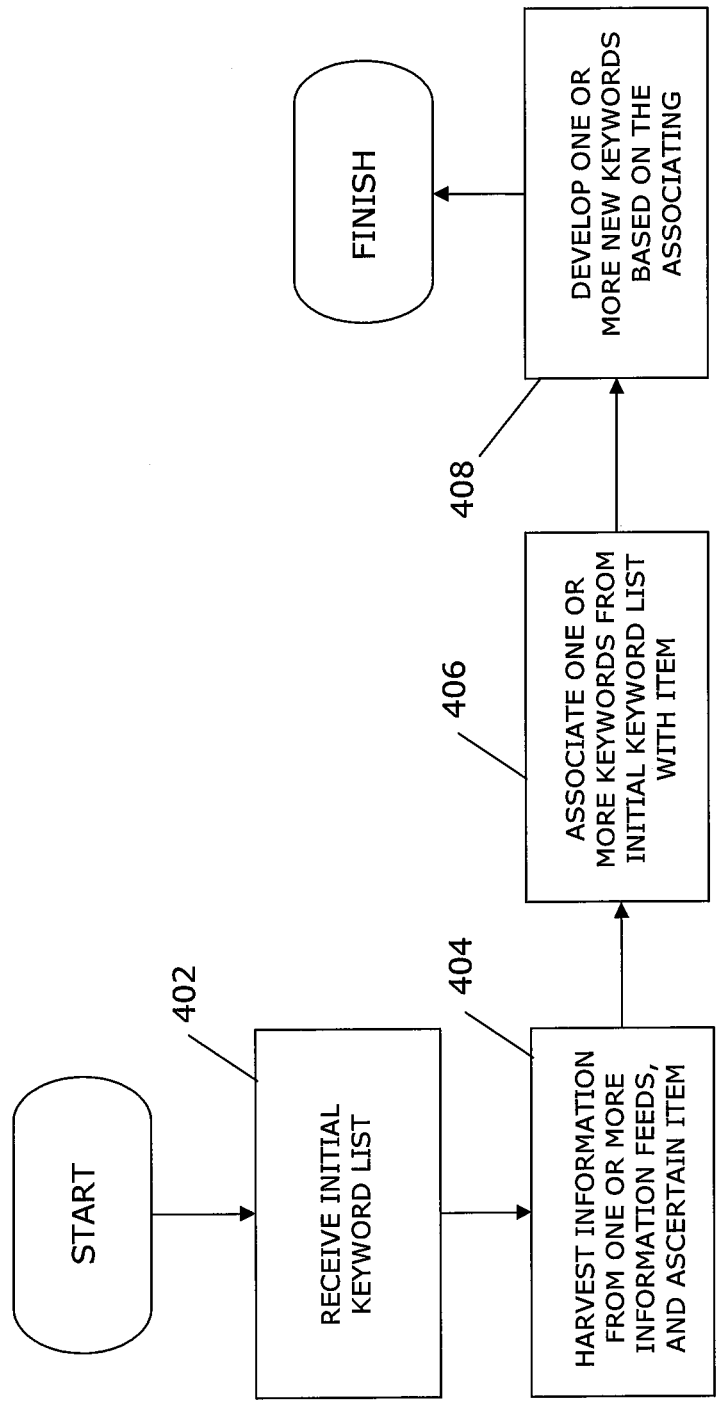
FIG. 4 sets forth a process more generally for keyword refinement an enhancement

FIG. 4 sets forth a process more generally for keyword refinement and enhancement, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, there is received an initial keyword list comprising one or more keywords (402). Information is harvested from at least one information feed, and an item is ascertained from the harvested information (404). One or more keywords from the initial keyword list are associated with the item (406). One or more new keywords are developed based on the associating of at least one keyword from the initial keyword list with the item (408).

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general pose or special pose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a on-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's compute (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products, it will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of keyword enhancement, said method comprising:
    utilizing a processor to execute computer code configured to perform the steps of:
    receiving an initial keyword list comprising one or more keywords;
    harvesting, using the initial keyword list, information from one or more social media information feeds and ascertaining a plurality of events from the harvested information, the events having a location and time;
    clustering, using at least one of the one or more keywords as a cluster center, the events based on location and time, each cluster being represented by a feature vector, wherein each feature vector comprises a set of keywords, the location, and the time associated with the cluster;
    identifying a temporal evolution state of the event and updating the feature vector associated with the cluster with the temporal evolution state; and
    updating the set of keywords associated with each cluster, wherein the updating the set of keywords comprises removing one or more keywords for event clusters identified as declining based upon the temporal evolution state of the event and adding one or more keywords for event clusters identified as growing based upon the temporal evolution state of the event;
    the updating the set of keywords comprising accepting the updated feature vector associated with the cluster, generating a candidate list, and comparing information from one or more social media information feeds with the candidate list to generate new keywords for growing event clusters.

2. The method according to claim 1, comprising determining a score for each of the events, the score indicating a strength of association between the information from one or more social media information feeds and the event.

3. The method according to claim 1, wherein said updating comprises applying a score to one or more possible new keywords and applying a threshold test to the applied score.

4. The method according to claim 3, wherein the score of the one or more possible new keywords is based on the score relative to the feature vector.

5. The method according to claim 1, wherein said updating comprises applying a score to one or more possible new keywords and applying a threshold test to the applied score.

6. The method according to claim 1, comprising updating the initial keyword list with the one or more new keywords.

7. The method according to claim 1, wherein the temporal evolution state comprises one member selected from the group consisting of: growing, declining, and no change.

8. The method according to claim 7, wherein said developing comprises selecting one or more new keywords with a bias towards a temporal evolution state of growing.

9. An apparatus for keyword enhancement, said apparatus comprising:
at least one processor; and
a computer readable storage medium having computer readable program code embodied therewith and executable by the at least one processor, the computer readable program code comprising:
computer readable program code configured to receive an initial keyword list comprising one or more keywords;
computer readable program code configured to harvest, using the initial keyword list, information from one or more social media information feeds and ascertain a plurality of events from the harvested information, the events having a location and time;
computer readable program code configured to cluster, using at least one of the one or more keywords as a cluster center, the events based on location and time, each cluster being represented by a feature vector, wherein each feature vector comprises a set of keywords, the location, and the time associated with the cluster;
computer readable program code configured to identify a temporal evolution state of the event and updating the feature vector associated with the cluster with the temporal evolution state; and
computer readable program code configured to update the set of keywords associated with each cluster, wherein the updating the set of keywords comprises removing one or more keywords for event clusters identified as declining based upon the temporal evolution state of the event and adding one or more keywords for event clusters identified as growing based upon the temporal evolution state of the event;
the updating the set of keywords comprising accepting the updated feature vector associated with the cluster, generating a candidate list, and comparing information from one or more social media information feeds with the candidate list to generate new keywords for growing event clusters.

10. A computer program product for keyword enhancement, said computer program product comprising:
a non-transitory computer readable storage medium having computer readable program code embodied therewith, the computer readable program code comprising:
computer readable program code configured to receive an initial keyword list comprising one or more keywords;
computer readable program code configured to harvest, using the initial keyword list, information from one or more social media information feeds and ascertain a plurality of events from the harvested information, the events having a location and time;
computer readable program code configured to cluster, using at least one of the one or more keywords as a cluster center, the events based on location and time, each cluster being represented by a feature vector, wherein each feature vector comprises a set of keywords, the location, and the time associated with the cluster;
computer readable program code configured to identify a temporal evolution state of the event and updating the feature vector associated with the cluster with the temporal evolution state; and
computer readable program code configured to update the set of keywords associated with each cluster, wherein the updating the set of keywords comprises removing one or more keywords for event clusters identified as declining based upon the temporal evolution state of the event and adding one or more keywords for event clusters identified as growing based upon the temporal evolution state of the event;
the updating the set of keywords comprising accepting the updated feature vector associated with the cluster, generating a candidate list, and comparing information from one or more social media information feeds with the candidate list to generate new keywords for growing event clusters.

11. The computer program product according to claim 10, wherein said computer readable program code is configured to determine a score for each of the events, the score indicating a strength of association between the information from one or more social media information feeds and the event.

12. The computer program product according to claim 11, wherein said updating comprises applying a score to one or more possible new keywords and applying a threshold test to the applied score.

13. The computer program product according to claim 12, wherein the score of the one or more possible new keywords is based on the score relative to the feature vector.

14. The computer program product according to claim 10, wherein said updating comprises applying a score to one or more possible new keywords and applying a threshold test to the applied score.

15. The computer program product according to claim 10, wherein said computer readable program code is configured to update the initial keyword list with the one or more new keywords.

16. A method comprising:
obtaining information relative to one or more events from a plurality of external social media information feeds;
comparing the obtained information to an input keyword list;
determining one or more events from the obtained information and matching the one or more events to one or more keywords from the input keyword list;
quantifying a correlation between the one or more events and the one or more matched keyword;
identifying a temporal evolution state of the one or more events; and
based on the quantified correlation, adding one or more new keywords to the one or more events identified as growing based upon the temporal evolution state of the one or more events and classifying the new keywords with a temporal evolution state, wherein adding one or more new keywords comprises accepting the one or more keywords matched with the one or more events, generating a candidate list of keywords for each of the one or more events, and comparing information from one or more social media information feeds with the candidate list to generate new keywords for the one or more events; and
based on the quantified correlation, removing one or more keywords from the one or more events identified as declining based upon the temporal evolution state of the one or more events.

* * * * *